United States Patent
Yilmaz et al.

(10) Patent No.: US 9,521,571 B2
(45) Date of Patent: Dec. 13, 2016

(54) METHOD AND APPARATUS OF SWITCHING COMMUNICATIONS FROM A FIRST CHANNEL TO A SECOND CHANNEL OF HIGHER-FREQUENCY

(71) Applicant: Nokia Technologies Oy, Espoo (FI)

(72) Inventors: Osman Yilmaz, Espoo (FI); Pekka Janis, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/901,790

(22) PCT Filed: Jul. 2, 2013

(86) PCT No.: PCT/FI2013/050724
§ 371 (c)(1),
(2) Date: Dec. 29, 2015

(87) PCT Pub. No.: WO2015/001166
PCT Pub. Date: Jan. 8, 2015

(65) Prior Publication Data
US 2016/0142927 A1    May 19, 2016

(51) Int. Cl.
*H04W 24/10* (2009.01)
*H04W 24/08* (2009.01)
(Continued)

(52) U.S. Cl.
CPC ........... *H04W 24/08* (2013.01); *H04B 17/318* (2015.01); *H04W 24/10* (2013.01);
(Continued)

(58) Field of Classification Search
CPC .. H04W 40/14; H04W 36/0088; H04W 24/10; H04W 28/085; H04W 24/08; H04W 72/082; H04B 17/318; H04B 7/00; H04B 7/10; H04B 1/66; H04B 1/7115; G10L 19/005; H04N 19/503; G06F 11/349; G06F 11/3419
See application file for complete search history.

(56) References Cited

U.S. PATENT DOCUMENTS

2006/0182185 A1* 8/2006 Horiguchi ............. H04L 1/0003
                                                                  375/241
2008/0019324 A1* 1/2008 Matsumoto ......... H04W 72/082
                                                                  370/335
(Continued)

FOREIGN PATENT DOCUMENTS

EP    2330761 A2    6/2011
EP    2590448 A1    5/2013
(Continued)

OTHER PUBLICATIONS

International Search Report and Written Opinion received for corresponding Patent Cooperation Treaty Application No. PCT/FI2013/050724, dated Jul. 2, 2013, 14 pages.

*Primary Examiner* — Thanh Le
(74) *Attorney, Agent, or Firm* — Nokia Technologies Oy

(57) ABSTRACT

A method and apparatus can be configured to measure channel conditions of a first channel (310). The first channel can correspond to a first frequency. The method can also include predicting whether the channel conditions of a second channel are favorable for offloading communication occurring on the first channel to the second channel based on measurements performed on the first channel (320). The second channel can correspond to a second frequency. The second frequency can be higher than the first frequency. The method can also include determining a rate of occurrence for monitoring the second channel based on the results of the predicting (330).

20 Claims, 5 Drawing Sheets

(51) Int. Cl.
*H04W 40/14* (2009.01)
*H04W 28/08* (2009.01)
*H04W 36/00* (2009.01)
*H04B 17/318* (2015.01)

(52) U.S. Cl.
CPC ..... *H04W 28/085* (2013.01); *H04W 36/0088* (2013.01); *H04W 40/14* (2013.01)

(56) References Cited

U.S. PATENT DOCUMENTS

| | | |
|---|---|---|
| 2010/0322185 A1 | 12/2010 | Park et al. |
| 2012/0276917 A1* | 11/2012 | Ben-Eli ................ H04B 17/318 455/452.2 |
| 2014/0010070 A1* | 1/2014 | Hayashitani ............. H04B 3/46 370/221 |
| 2014/0269374 A1* | 9/2014 | Abdelmonem ....... H04L 5/0026 370/252 |

FOREIGN PATENT DOCUMENTS

| | | |
|---|---|---|
| WO | 2011063963 A1 | 6/2011 |
| WO | 2013006380 A1 | 1/2013 |
| WO | 2013048302 A1 | 4/2013 |

* cited by examiner

METHOD AND APPARATUS OF SWITCHING COMMUNICATIONS FROM A FIRST CHANNEL TO A SECOND CHANNEL OF HIGHER-FREQUENCY

RELATED APPLICATION

This application was originally filed as Patent Cooperation Treaty Application No. PCT/FI2013/050724 filed on Jul. 2, 2013.

BACKGROUND

Field

Embodiments of the invention relate to switching communications from a first channel to a second channel of higher-frequency.

Description of the Related Art

Long-term Evolution (LTE) is a standard for wireless communication that seeks to provide improved speed and capacity for wireless communications by using new modulation/signal processing techniques. The standard was proposed by the 3rd Generation Partnership Project (3GPP), and is based upon previous network technologies. Since its inception, LTE has seen extensive deployment in a wide variety of contexts involving the communication of data.

SUMMARY

According to a first embodiment, a method can include measuring channel conditions of a first channel The first channel corresponds to a first frequency. The method can also include predicting whether the channel conditions of a second channel are favorable for offloading communication occurring on the first channel to the second channel based on measurements performed on the first channel The second channel corresponds to a second frequency. The second frequency is higher than the first frequency. The method can also include determining a rate of occurrence for monitoring the second channel based on the results of the predicting.

In the method of the first embodiment, the first frequency is below 6 GHz, and the second frequency is above 6 GHz.

In the method of the first embodiment, determining the rate of occurrence for monitoring the second channel comprises at least one of a success rate of previous predictions, a quality of service indicator of the second channel, and a load indicator of the second channel.

In the method of the first embodiment, determining the rate of occurrence for monitoring the second channel comprises determining a lower rate of occurrence if the channel conditions of the second channel are predicted to not be favorable for offloading the communication.

In the method of the first embodiment, predicting whether the channel conditions of the second channel are favorable for offloading the communication comprises predicting whether at least one of a line-of-sight condition or sufficient reference-signal-strength indicator is available for the second channel.

In the method of the first embodiment, measuring channel conditions of the first channel comprises measuring at least one of a reference-signal-strength indicator, a delay spread indicator, and a proportion of channel impulse response energy in a first tap of a channel impulse response.

In the method of the first embodiment, predicting whether the channel conditions of the second channel are favorable for offloading the communication is performed using at least one classifier, and the classifier performs the prediction based on the measured channel conditions of the first channel.

According to a second embodiment, an apparatus may comprise at least one processor. The apparatus can also include at least one memory including computer program code. The at least one memory and the computer program code can be configured, with the at least one processor, to cause the apparatus at least to measure channel conditions of a first channel. The first channel corresponds to a first frequency. The apparatus can also predict whether the channel conditions of a second channel are favorable for offloading communication occurring on the first channel to the second channel based on measurements performed on the first channel, wherein the second channel corresponds to a second frequency, and the second frequency is higher than the first frequency. The apparatus can also determine a rate of occurrence for monitoring the channel conditions of the second channel based on the results of the predicting.

In the apparatus of the second embodiment, the first frequency is below 6 GHz, and the second frequency is above 6 GHz.

In the apparatus of the second embodiment, determining the rate of occurrence for monitoring the second channel comprises at least one of a success rate of previous predictions, a quality of service indicator of the second channel, and a load indicator of the second channel.

In the apparatus of the second embodiment, determining the rate of occurrence for monitoring the second channel comprises determining a lower rate of occurrence if the channel conditions of the second channel are predicted to not be favorable for offloading the communication.

In the apparatus of the second embodiment, predicting whether the channel conditions of the second channel are favorable for offloading the communication comprises predicting whether at least one of a line-of-sight condition or sufficient reference-signal-strength indicator is available for the second channel.

In the apparatus of the second embodiment, measuring channel conditions of the first channel comprises measuring at least one of a reference-signal-strength indicator, a delay spread indicator, and a proportion of channel impulse response energy in a first tap of a channel impulse response.

In the apparatus of the second embodiment, predicting whether the channel conditions of the second channel are favorable for offloading the communication is performed using at least one classifier, and the classifier performs the prediction based on the measured channel conditions of the first channel.

According to a third embodiment, a computer program product can be embodied on a non-transitory computer readable medium. The computer program product can be configured to control a processor to perform a process comprising measuring channel conditions of a first channel, wherein the first channel corresponds to a first frequency. The process can include predicting whether the channel conditions of a second channel are favorable for offloading communication occurring on the first channel to the second channel based on measurements performed on the first channel The second channel corresponds to a second frequency. The second frequency is higher than the first frequency. The process can include determining a rate of occurrence for monitoring the second channel based on the results of the predicting.

In the computer program product of the third embodiment, determining the rate of occurrence for monitoring the second channel comprises at least one of a success rate of previous predictions, a quality of service indicator of the second channel, and a load indicator of the second channel.

In the computer program product of the third embodiment, the first frequency is below 6 GHz, and the second frequency is above 6 GHz.

In the computer program product of the third embodiment, determining the rate of occurrence for monitoring the second channel comprises determining a lower rate of occurrence if the channel conditions of the second channel are predicted to not be favorable for offloading the communication.

In the computer program product of the third embodiment, predicting whether the channel conditions of the second channel are favorable for offloading the communication comprises predicting whether at least one of a line-of-sight condition or sufficient reference-signal-strength indicator is available for the second channel.

In the computer program product of the third embodiment, measuring channel conditions of the first channel comprises measuring at least one of a reference-signal-strength indicator, a delay spread indicator, and a proportion of channel impulse response energy in a first tap of a channel impulse response.

In the computer program product of the third embodiment, predicting whether the channel conditions of the second channel are favorable for offloading the communication is performed using at least one classifier, and the classifier performs the prediction based on the measured channel conditions of the first channel.

BRIEF DESCRIPTION OF THE DRAWINGS

For proper understanding of the invention, reference should be made to the accompanying drawings, wherein.

DETAILED DESCRIPTION

Figure 1:
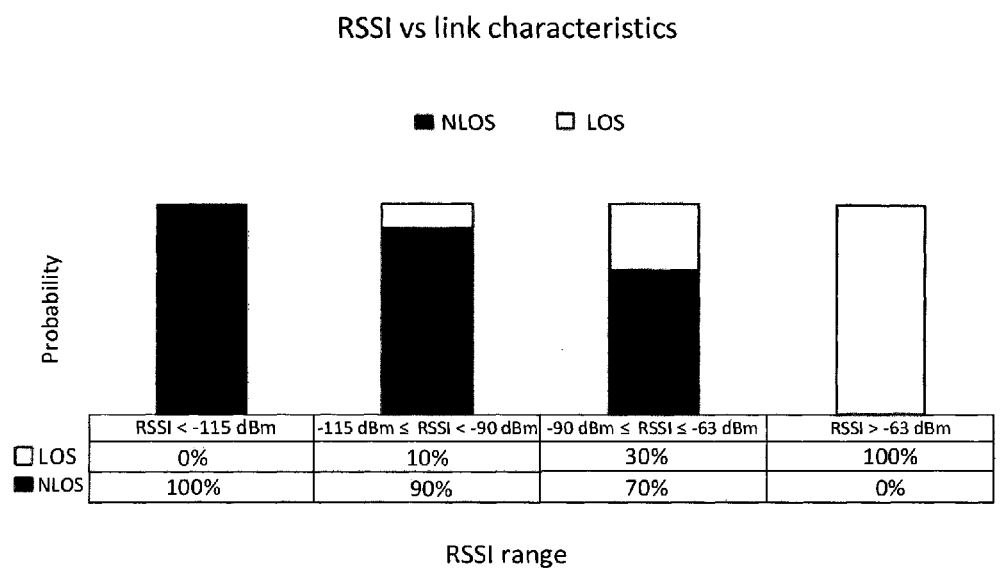
FIG. 1 illustrates an example of received signal power versus link characteristics in accordance with embodiments of the invention.

Certain embodiments of the present invention relate to switching communications from a first channel to a second channel of higher-frequency.

Mobile communication services generally use spectral resources/channels that are within or up to the ultra-high frequencies (UHF) range (roughly, below 6 GHz). However, due to the large number of users of spectral resources below 6 GHz, the part of the spectrum below 6 GHz has become crowded.

Yet, the demand for spectral resources that will be generated by future wireless communications systems is expected to greatly exceed the currently-available supply of spectral resources below 6 GHz. For example, in the future, if multiple users request service simultaneously, with each user seeking to stream uncompressed interactive high-quality 3D visual content, much larger amounts of spectral resources will be needed.

Because the spectral-resources/frequency-bands in the sub-6 GHz frequency range are insufficient to meet the expected demand, wireless communications systems will likely attempt to access the spectral resources that are above 6 GHz. These spectral resources can be generally referred to as high-frequency resources. One example of bands that correspond to the high-frequency resources are the millimeter-wave bands (mmW bands).

Once the spectral resources that are above 6 GHz can be accessed, operators of wireless communication systems can seek to offload at least a portion of the communications from the sub-6 GHz bands to the bands that are above 6 GHz. Thus, the operators can utilize the bands/spectral resources above 6 GHz while freeing up bands/spectral resources that are below 6 GHz.

Although one embodiment can consider the low-frequency resources to be in a range below 6 GHz and the high-frequency resources to be in a range above 6 GHz, these ranges are merely example ranges for the low-frequency resources and the high-frequency resources. In another embodiment, the low-frequency resources can be in a range from 0 to 3 GHz, while the high-frequency resources can be in a range above 3 GHz (such as between 3 to 300 GHz, for example). In another embodiment, the low-frequency resources can be in a range from 0 to 30 GHz, while the high-frequency resources can be in a range above 30 GHz (such as between 30 to 300 GHz, for example). Other designations for low-frequency resources and high-frequency resources can also be used, which also result in substantially different propagation characteristics between the low-frequency resources and the high-frequency resources. Further, embodiments of the present invention are not limited to separation of low and high frequencies via frequency ranges. Frequency difference can also be used as a criterion to define high-frequency. For example, if a difference between two carrier frequencies is a certain amount (such as 5 GHz, for example), the higher frequency can be defined as a high-frequency carrier in the context of certain embodiments of the present invention.

Although communication from a sub-6 GHz band can possibly be offloaded to higher-frequency spectral resources, the propagation characteristics of the higher-frequency spectral resources (such as the resources of the mmW spectrum) are generally different compared to the propagation characteristics of the sub-6 GHz spectral resources. If a wireless communication system uses the mmW spectrum, the poor propagation characteristics of the mmW spectrum can severely limit the coverage area provided by such a wireless communication system.

As a result of the poor propagation characteristics of the spectrum higher than 6 GHz, in order for a wireless communication system to successfully offload its traffic load (such as traffic generated by Device-to-Device (D2D) communications or ad-hoc wireless communications of group devices or cellular-communications) to a high frequency layer/channel (corresponding to the spectral resources above 6 GHz), certain conditions may need to exist. Because certain conditions may need to exist in order for the offloading to occur, one embodiment of the present invention is directed to a wireless communication system that detects the presence of the favorable conditions that allow offloading of traffic to a higher frequency layer/channel. As an example, the presence of a Line-of-Sight (LOS) link may be a condition that is necessary for the offloading to occur. Performing communications in the higher frequency layer can correspond to performing mmW communications.

In order to offload traffic to a higher frequency layer/channel, one embodiment of the present invention offloads the traffic to a component carrier in a higher frequency. The component carrier in the higher frequency can be in a higher frequency above 6 GHz, for example. However, a user equipment (UE) may need to continuously monitor these high-frequency component carrier(s) to determine when the offloading is possible. Because the propagation characteristics of high frequency resources can experience heavier signal deterioration within obstructed environments, communication using frequencies above 6 GHz (such as mmW communication) may require the presence of a short-range Line-Of-Sight (LOS) link.

In view of the above, one embodiment of the present invention establishes a first connection (a baseline connectivity) which transmits communication via a lower-frequency channel/band (such as sub-6 GHz bands). While the first connection/channel is implemented, measurements conducted on the lower-frequency channel/band can be used to determine if offloading communication to a higher-frequency channel/band is feasible. The measurements can be conducted on the signal characteristics/channel information of the lower-frequency bands. These measurements can then be used to infer whether the conditions of the high-frequency channels/bands are favorable for offloading traffic to the high-frequency channels/bands.

In view of the above, one embodiment of the present invention can measure the signal characteristics/channel information corresponding to a signal received from a base station via lower-frequency bands. The embodiment can then use these measurements to infer the high-frequency channel conditions for the same base station.

Similarly, another embodiment of the present invention can measure the signal characteristics/channel information corresponding to a signal received from a device via lower-frequency bands. The embodiment can then use these measurements to infer the high-frequency channel conditions for the same device.

However, if a communication system continually conducts measurements to determine whether offloading communication is feasible, the continual conducting of measurements can cause unnecessary energy-consumption by the communication system. Therefore, it would be generally beneficial if unnecessary measurements can be reduced in order to save energy.

In view of the above considerations, in one embodiment of the present invention, a user equipment can periodically monitor/scan the high-frequency carriers/high-frequency channels, as opposed to continually monitoring/scanning the channels of high frequency carriers. The user equipment can periodically monitor/scan the high-frequency carriers according to a determined rate of occurrence. The determined rate of occurrence can be dynamically tuned according to received signal characteristics/channel information.

Examples of received signal characteristics/channel information can include a reference-signal-strength indicator (RSSI) (such as reference-signal-received-power (RSRP) in 3 GPP LTE technology), and/or a delay spread indicator (such as a root-mean-square (RMS) delay spread), and/or a proportion of channel impulse response energy (CIR) (such as a proportion of CIR energy in a first tap of a CIR).

With regard to the CIR taps received by a UE, if a transmitting node such as a base station or a relay or a device transmits a signal to the UE, the signal can directly reach the UE and can also reach the UE after being reflected by various obstacles in between the transmitting node and the UE. The same phenomenon can also be experienced when the UE transmits to a receiver node such as a base station or a relay or a device. The energy of a first tap is generally considered to be the amount of energy corresponding to the signal that was directly received by the UE from the base station (such as the base station transmits to the UE), in the event that a LOS condition exists. If a proportion of CIR energy in a first tap indicates that a large proportion of the energy was received in the first tap (as opposed to being received in subsequent taps corresponding to instances of reflected signals), then offloading of the communication to a higher-frequency level is more likely to be feasible, as described in more detail below.

Channel information can be obtained from the values of parameters which represent the attenuation, phase change and delay in the received signal relative to the transmitted signal, due to radio channel conditions between transmitter and receiver.

In one embodiment, the received signal characteristics/channel information can be received via the low-frequency component carrier. The received signal characteristics/channel information can also be measured while the communication system transmits communication via the low-frequency component carrier. As discussed above, the measurements conducted can be used to ascertain whether it is feasible to switch on-going communications to the high-frequency component carrier.

In another embodiment, the rate of occurrence for scanning/monitoring the high-frequency component carrier can be tuned and configured by a base station, or can be tuned autonomously by a UE. Either the UE or a base station can receive and/or measure the signal characteristics/channel information of the low-frequency carrier. The base station can also be replaced by another node, such as a different device or relay.

In another embodiment, the rate of occurrence for scanning/monitoring the high-frequency component carrier for the communications between two nodes (such as D2D communications) can be tuned and configured by a third node (such as a base station or a third UE).

In another embodiment, to determine a rate of occurrence for monitoring the high-frequency carrier, a result of the prediction history (such as a success rate of predictions made previously), and/or a quality of service indicator of the high-frequency channel (such as throughput/delay/signal quality/signal strength), and/or a load indicator of the high-frequency channel can be used in addition to the results of predicting based on signal characteristics/channel information of the low-frequency carrier.

In another embodiment, once the measurements are completed, if the received signal characteristics/channel information (measured in the low-frequency carrier) indicate that the high-frequency channels/bands are not suitable for offloading the wireless communication upon, the rate of occurrence for monitoring the high-frequency channels/bands can be reduced. In another embodiment, if the high-frequency channels/bands do not appear to be suitable for offloading the wireless communication upon, the radio frequency and baseband units dedicated for the high frequencies can be switched off, thus conserving energy.

As described above, embodiments of the present invention measure the received signal characteristics/channel information (of the low-frequency bands) to predict whether the conditions of the high-frequency bands are favorable for offloading communication from the low-frequency bands to the high-frequency bands. In one embodiment, the measurements for the received signal characteristics/channel information can be used to infer/predict a path-loss in the higher frequencies. A lower path-loss tends to indicate that the offloading is feasible. Further, the received signal characteristics/channel information can be used to predict LOS channel availability within the higher-frequencies. As described above, an LOS channel may be necessary for the offloading to occur.

FIG. 1 illustrates received signal power versus link characteristics in accordance with embodiments of the invention. Referring to FIG. 1, the x-axis displays several received power intervals assuming 0 dBm (1 mW) transmit power. This received power can be considered to be values of RSSI. The simulation results of FIG. 1 show that higher RSSI values (received in the lower-frequency bands) will generally result in a higher likelihood that an LOS is present in the higher-frequency bands. The correlation between the LOS condition and high RSSI is evident from the fact that the probability of LOS becomes larger when RSSI increases. Specifically, when RSSI increases to the largest RSSI range, the probability value reflected by "LOS" is higher than the value reflected by "NLOS".

FIG. 1 illustrates a correlation between RSSI and the likelihood that an LOS is available. In addition to using RSSI measurements, other embodiments can use other measurements to ascertain whether offloading traffic to the higher-frequency channels/bands is feasible. For example, another embodiment can also use a proportion of CIR energy (such as a proportion of CIR energy in a first tap), and/or a delay indicator (such as an RMS value of the delay spread) to perform LOS channel prediction. As described above, the proportion of channel impulse response (CIR) energy in the first tap can correspond to the amount of energy received in the first tap (for example, received by a UE) compared to the total amount of energy received in all the taps. The proportion can generally be calculated using equation 1 below:

$$X = \text{(Power of the first tap)}/\text{(Sum of power of all received taps)} \quad (1)$$

As described above, if a greater proportion of energy is received in the first tap as compared to the other subsequent taps, then there is a higher likelihood that propagation conditions in the high-frequency channels/bands are favorable for offloading communication to the high-frequency channels/bands.

In another embodiment, a classifier can be used to analyze one or more signal/channel characteristics to determine whether LOS conditions exist or not. Another embodiment can use a plurality of classifiers to analyze a plurality of signal/channel characteristics. In one embodiment, a linear discriminant analysis (LDA) classifier, described in R. A. Fisher: "The Use of Multiple Measurements in Taxonomic Problems" in Annals of Eugenics 7 (2): 179-188, can be used to analyze signal/channel characteristics such as RSSI, RMS delay spread, and/or ratio of CIR power in the first tap of the CIR, as in equation (1). Other types of classifiers may be also utilized. In some embodiments, the classifier may produce a likelihood of favorable conditions for communication on high frequency resources.

One embodiment performs a plurality of observations for each link of the low-frequency channel. For example, one embodiment can perform three observations to be used as an input to the classifier. Of the three observations for each link, one observation can be a received power (for example, in milliWatts). Another observation can be an RMS delay spread (for example, in microseconds). Another observation can be the ratio of CIR power in the first tap of the CIR, as in equation (1) (for example, in milliWatts). In some embodiments, these observations may be obtained from estimating the channel characteristics utilizing the reference signals transmitted and received on the low-frequency channel.

Further, one embodiment of the present invention can apply a linear classifier to the data. One example of a linear classifier is a linear discriminant analysis (LDA) classifier. One embodiment transforms the data so it is closer to being Gaussian distributed by taking a logarithm of the RMS delay spread and received power.

By using the above embodiments, LOS and NLOS can be predicted accurately. In some instances, a detection probability of NLOS conditions can be 97.5%. In other words, with such a classifier, if a decision is made to not scan a high-frequency band (such as an mmW band) because a NLOS condition appears to be prevailing, the decision is wrong only 2.5% of the time. Such an observation is based on channel models (such as a WINNER phase II spatial channel model, described in document IST-WINNER D1.1.2 by P. Kyösti, et al.: "WINNER II Channel Models", ver 1.1, Sept. 2007), which is based on extensive field measurements.

However, in circumstances where a classifier is not able to accurately ascertain LOS and NLOS conditions, the classifier may be improved/re-trained to more accurately infer the conditions of the high-frequency bands (such as the mmW bands). In a multi-antenna array eNB, each resolvable channel path (tap) has its spatial correlation value available (which may be called the spatial signature of the path). The spatial signature contains the relative phase and amplitude of the received path at each of the multiple antenna elements. When the eNB starts logging the measured mmW channel quality versus these CIR/delay/RSSII/spatial correlation observations, it can learn when the mmW connection may be established. This way, although measurements of the high-frequency channels are monitored/measured frequently in the beginning, in the long-run the monitoring/measurements performed can be much less (as the eNB learns the environment in which it is deployed). In some embodiments, the learning may comprise updating a classifier such as, for example, the LDA classifier.

Other embodiments can perform other types of measurements. Other types of measurements may include measurements relating to the spatial signature of each resolvable path (or a transformation thereof such as the direction of arrival estimate). Such a measurement is possible, for example, when a base station transceiver is equipped with multiple antennas. Furthermore, the direction of arrival estimates may be utilized in combination with estimates of the geographic location of a user equipment.

Figure 2:
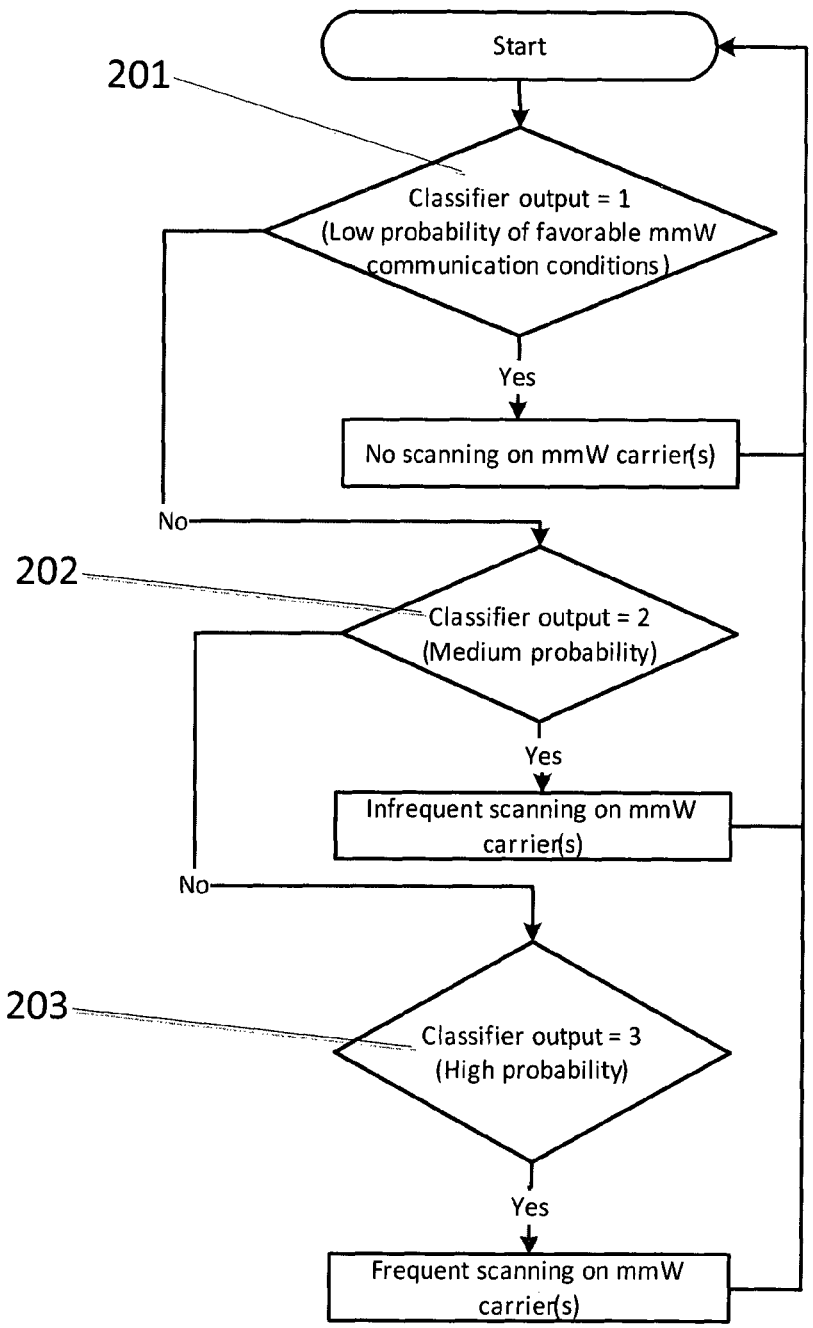
FIG. 2 illustrates a logic flow diagram of a method according to embodiments of the invention.

FIG. 2 illustrates a logic flow diagram of a method according to certain embodiments of the invention. An exemplary flow-chart for the proposed method (to dynamically tune the high-frequency component carrier measurement occurrence) is given in FIG. 2.

As shown in FIG. 2, a classifier output value, which takes one of a plurality of output values, can be used to determine the rate of occurrence for scanning/monitoring the high-frequency bands. For example, if a condition corresponding to a first classifier output is met, "classifier output=1" 201 can indicate to the communication system that the high-frequency bands clearly are not suitable for offloading traffic onto, and thus the communication system should not perform scanning on the high-frequency bands. Next, the communication system can infer from the classifier output of "classifier output=2" 202 or "classifier output=3" 203 to determine whether the communication system should perform (1) infrequent scanning of the high-frequency bands, or (2) frequent scanning of the high-frequency bands. The output of the classifier may be simply based on a measured signal characteristic/channel information indicator compared with a threshold, or an advanced classifier which takes into account measurement of more than one signal characteristic/channel information indicator. In some embodiments, the output of the classifier is obtained by mapping an estimated likelihood of favorable conditions for communication on high frequency resources into a range of likelihood values corresponding to low, medium, and high likelihood.

In view of the above, one embodiment tunes the measurement rate-of-occurrence for the high-frequency component carrier. The rate of occurrence can be configured by a base station (based on the reported UE measurements and/or base station measurements) or autonomously by the UE.

Figure 3:
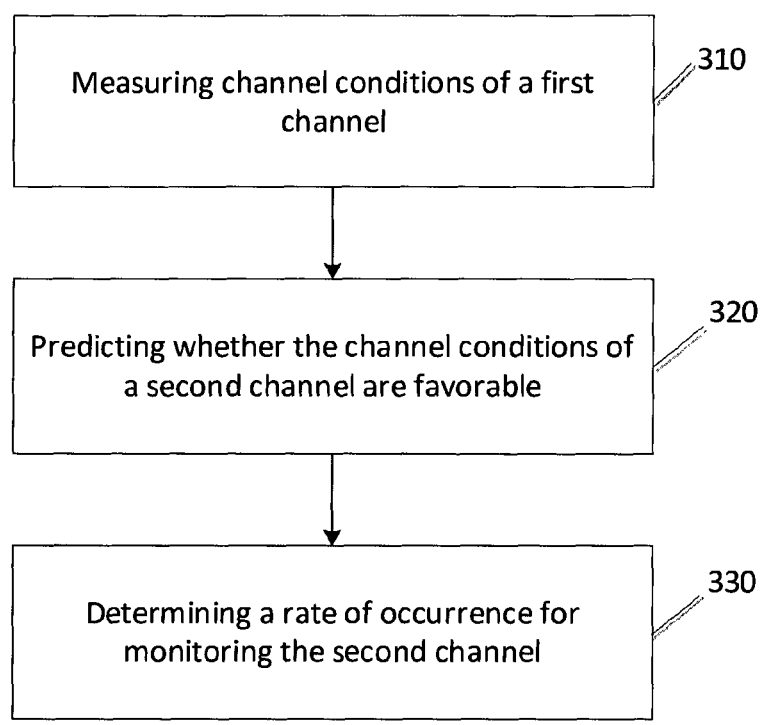
FIG. 3 illustrates a logic flow diagram of a method according to embodiments of the invention.

FIG. 3 illustrates a logic flow diagram of a method according to certain embodiments of the invention. The method illustrated in FIG. 3 includes, at 310, measuring channel conditions of a first channel The first channel can correspond to a first frequency. The method can also include, at 320, predicting whether the channel conditions of a second channel are favorable for offloading the communication occurring on the first channel to the second channel based on measurements performed on the first channel The second channel can correspond to a second frequency, and the second frequency can be higher than the first frequency. The method can also include, at 330, determining a rate of occurrence for monitoring the second channel based on the results of the predicting. In addition, a result of the prediction history (such as a success rate of predictions made previously), and/or a quality of service indicator of the second channel (such as throughput/delay/signal quality/signal strength), and/or a load indicator of the second channel can be used to determine a rate of occurrence for monitoring the second channel.

Figure 4:
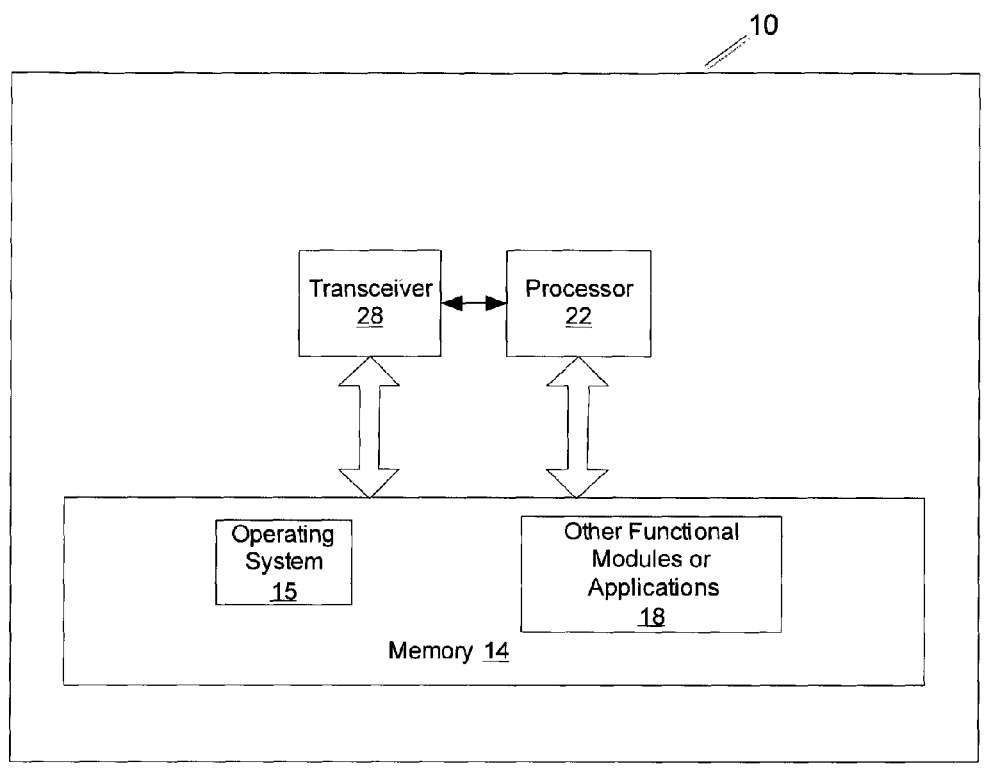
FIG. 4 illustrates an apparatus according to embodiments of the invention.

FIG. 4 illustrates an apparatus 10 according to embodiments of the invention. Apparatus 10 can be a receiving device, such as a UE, for example. In other embodiments, apparatus 10 can be a base station, for example.

Apparatus 10 can include a processor 22 for processing information and executing instructions or operations. Processor 22 can be any type of general or specific purpose processor. While a single processor 22 is shown in FIG. 4, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In certain embodiments, memory 14 stores software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 5:
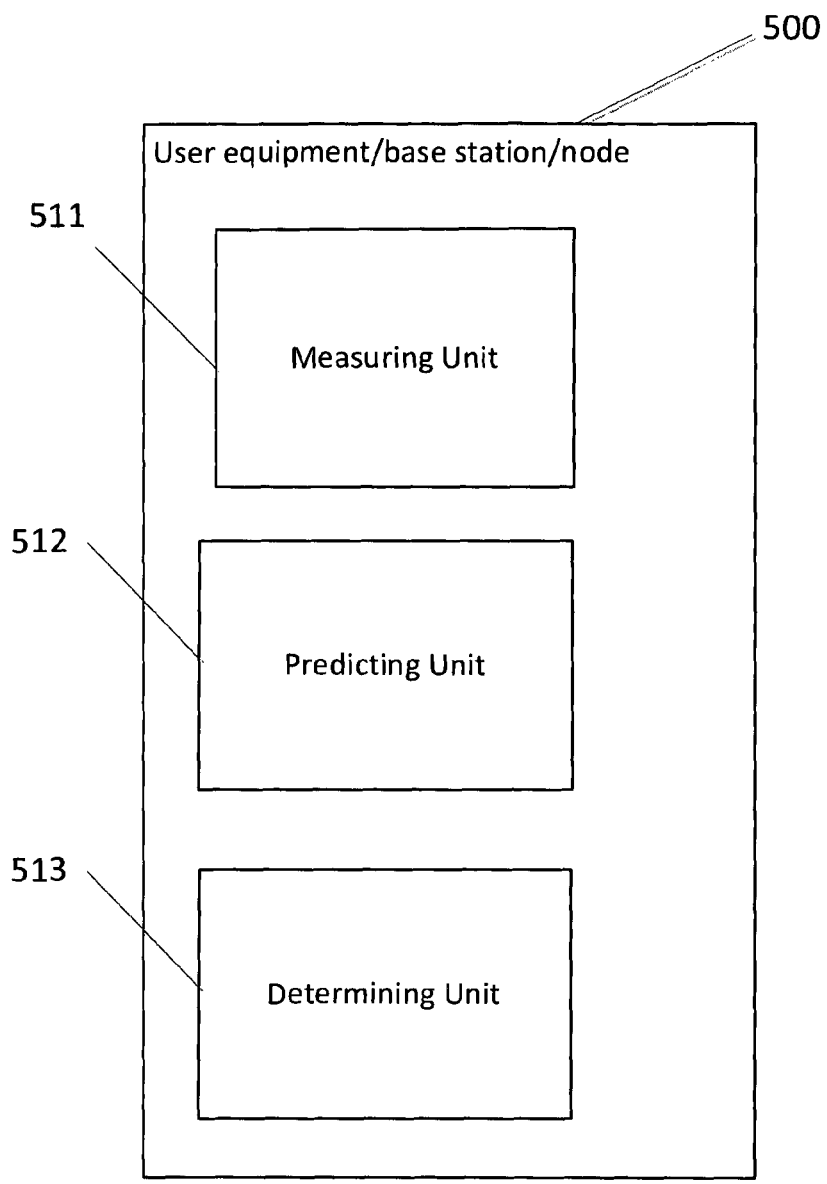
FIG. 5 illustrates an apparatus according to embodiments of the invention.

FIG. 5 illustrates an apparatus 500 according to other embodiments of the invention. Apparatus 500 can be, for example, a user equipment. In other embodiments, apparatus 500 can be a base station. In other embodiments, apparatus 500 can be a relay device. Apparatus 500 can include a measuring unit 511 that measures channel conditions of a first channel The first channel corresponds to a first frequency. Apparatus 500 can also include a predicting unit 512 that predicts whether the channel conditions of a second channel are favorable for offloading communication occurring on the first channel to the second channel based on measurements performed on the first channel. The second channel can correspond to a second frequency, and the second frequency can be higher than the first frequency. Apparatus 500 can also include a determining unit 513 that determines a rate of occurrence for monitoring the second channel based on the results of the predicting. In addition, a result of the prediction history (such as a success rate of predictions made previously), and/or a quality of service indicator of the second channel (such as throughput/delay/signal quality/signal strength), and/or a load indicator of the second channel can be used to determine a rate of occurrence for monitoring the second channel.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   measuring channel conditions of a first channel, wherein the first channel corresponds to a first frequency;

predicting whether the channel conditions of a second channel are favorable for offloading communication occurring on the first channel to the second channel based on measurements performed on the first channel, wherein the second channel corresponds to a second frequency, and the second frequency is higher than the first frequency; and determining a rate of occurrence for monitoring the second channel based on the results of the predicting.

2. The method according to claim 1, wherein the first frequency is below 6 GHz, and the second frequency is above 6 GHz.

3. The method according to claim 1, wherein determining the rate of occurrence for monitoring the second channel comprises at least one of a success rate of previous predictions, a quality of service indicator of the second channel, and a load indicator of the second channel.

4. The method according to claim 1, wherein determining the rate of occurrence for monitoring the second channel comprises determining a lower rate of occurrence if the channel conditions of the second channel are predicted to not be favorable for offloading the communication.

5. The method according to claim 1, wherein predicting whether the channel conditions of the second channel are favorable for offloading the communication comprises predicting whether at least one of a line-of-sight condition or sufficient reference-signal-strength indicator is available for the second channel.

6. The method according to claim 1, wherein measuring channel conditions of the first channel comprises measuring at least one of a reference-signal-strength indicator, a delay spread indicator, and a proportion of channel impulse response energy in a first tap of a channel impulse response.

7. The method according to claim 1, wherein predicting whether the channel conditions of the second channel are favorable for offloading the communication is performed using at least one classifier, and the classifier performs the prediction based on the measured channel conditions of the first channel.

8. An apparatus, comprising:
  at least one processor; and
  at least one memory including computer program code,
  the at least one memory and the computer program code configured, with the at least one processor, to cause the apparatus at least to
  measure channel conditions of a first channel, wherein the first channel corresponds to a first frequency;
  predict whether the channel conditions of a second channel are favorable for offloading communication occurring on the first channel to the second channel based on measurements performed on the first channel, wherein the second channel corresponds to a second frequency, and the second frequency is higher than the first frequency; and
  determine a rate of occurrence for monitoring the second channel based on the results of the predicting.

9. The apparatus according to claim 8, wherein the first frequency is below 6 GHz, and the second frequency is above 6 GHz.

10. The apparatus according to claim 8, wherein determining the rate of occurrence for monitoring the second channel comprises at least one of a success rate of previous predictions, a quality of service indicator of the second channel, and a load indicator of the second channel.

11. The apparatus according to claim 8, wherein determining the rate of occurrence for monitoring the second channel comprises determining a lower rate of occurrence if the channel conditions of the second channel are predicted to not be favorable for offloading the communication.

12. The apparatus according to claim 8, wherein predicting whether the channel conditions of the second channel are favorable for offloading the communication comprises predicting whether at least one of a line-of-sight condition or sufficient reference-signal-strength indicator is available for the second channel.

13. The apparatus according to claim 8, wherein measuring channel conditions of the first channel comprises measuring at least one of a reference-signal-strength indicator, a delay spread indicator, and a proportion of channel impulse response energy in a first tap of a channel impulse response.

14. The apparatus according to claim 8, wherein predicting whether the channel conditions of the second channel are favorable for offloading the communication is performed using at least one classifier, and the classifier performs the prediction based on the measured channel conditions of the first channel.

15. A computer program product, embodied on a non-transitory computer readable medium, the computer program product configured to control a processor to perform a process, comprising:
  measuring channel conditions of a first channel, wherein the first channel corresponds to a first frequency;
  predicting whether the channel conditions of a second channel are favorable for offloading communication occurring on the first channel to the second channel based on measurements performed on the first channel, wherein the second channel corresponds to a second frequency, and the second frequency is higher than the first frequency; and
  determining a rate of occurrence for monitoring the second channel based on the results of the predicting.

16. The computer program product according to claim 15, wherein determining the rate of occurrence for monitoring the second channel comprises at least one of a success rate of previous predictions, a quality of service indicator of the second channel, and a load indicator of the second channel.

17. The computer program product according to claim 15, wherein the first frequency is below 6 GHz, and the second frequency is above 6 GHz.

18. The computer program product according to claim 15, wherein determining the rate of occurrence for monitoring the second channel comprises determining a lower rate of occurrence if the channel conditions of the second channel are predicted to not be favorable for offloading the communication.

19. The computer program product according to claim 15, wherein predicting whether the channel conditions of the second channel are favorable for offloading the communication comprises predicting whether at least one of a line-of-sight condition or sufficient reference-signal-strength indicator is available for the second channel.

20. The computer program product according to claim 15, wherein measuring channel conditions of the first channel comprises measuring at least one of a reference-signal-strength indicator, a delay spread indicator, and a proportion of channel impulse response energy in a first tap of a channel impulse response.

* * * * *